United States Patent [19]

Parker

[11] Patent Number: 5,391,018
[45] Date of Patent: Feb. 21, 1995

[54] PROCESS FOR WASHING CONTAMINATED SOIL

[75] Inventor: Harry W. Parker, Lubbock, Tex.

[73] Assignee: Toxic Environmental Control Systems, Inc., Lubbock, Tex.

[21] Appl. No.: 862,422

[22] Filed: Apr. 2, 1992

[51] Int. Cl.$^6$ .............................................. B09B 3/00
[52] U.S. Cl. ................................. 405/128; 405/131; 210/751
[58] Field of Search ................ 405/128, 131; 210/748, 210/747, 751, 774; 134/125.1, 126.1, 40

[56] References Cited

U.S. PATENT DOCUMENTS

| | | | |
|---|---|---|---|
| 3,905,891 | 9/1975 | Prestridge et al. | 204/308 X |
| 4,581,120 | 4/1986 | Sublette | 204/308 X |
| 4,957,393 | 9/1990 | Buelt et al. | 405/128 |
| 4,969,775 | 11/1990 | Cappel et al. | 405/128 |
| 4,993,873 | 2/1991 | Tippmer | 405/128 |
| 5,024,556 | 6/1991 | Timmerman | 405/128 |
| 5,072,674 | 12/1991 | Noland et al. | 110/346 |
| 5,078,868 | 1/1992 | Robertson | 210/909 X |
| 5,149,444 | 9/1992 | Hoch | 405/128 X |
| 5,172,709 | 12/1992 | Eckhardt et al. | 210/747 X |

Primary Examiner—Dennis L. Taylor
Attorney, Agent, or Firm—Henry Croskell

[57] ABSTRACT

A process and apparatus is presented for removing contaminants from particulate materials especially earth materials by converting said materials by mixture with water and additives to slurries which are energized to volume boiling conditions thereby dislodging contaminant components from the particulate materials, said dislodging can be enhanced through centrifugal or cyclone apparatus for example, which contains electrodes in direct contact with the slurry along the walls of the cyclone. An electrical current flows through the slurry as the energizing source. The focus of the process and apparatus is directed to scrubbing both organic and inorganic contaminants from the surface of very small soil or mineral particles while said particles are in a water slurry, the slurry being treated by energizing means which dislodges or scrubs off contaminant components from the soil particles allowing for subsequent treatment such as washing of the soil and separation of the contaminant components from the slurry for further processing.

24 Claims, 4 Drawing Sheets

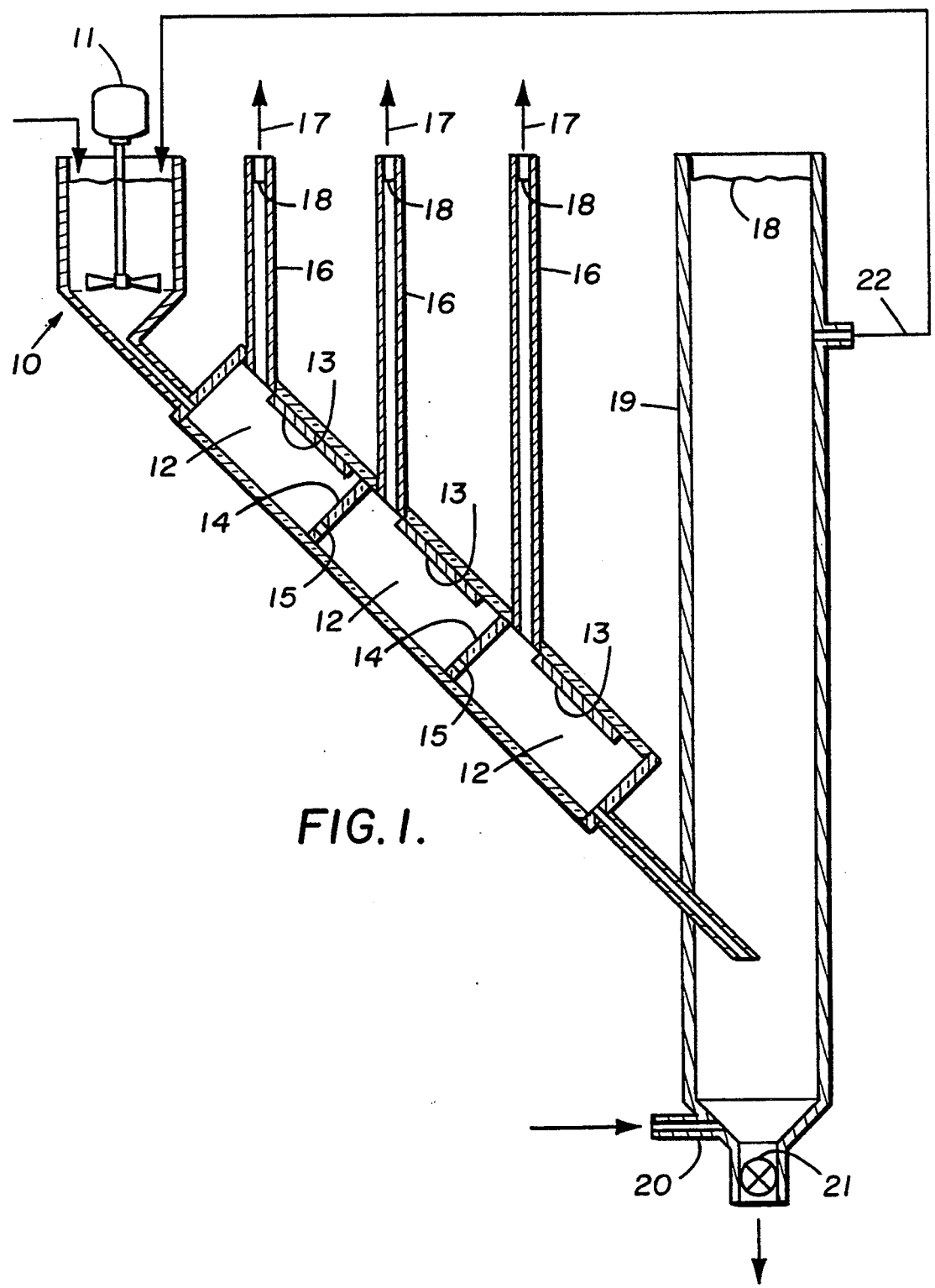
FIG. I.

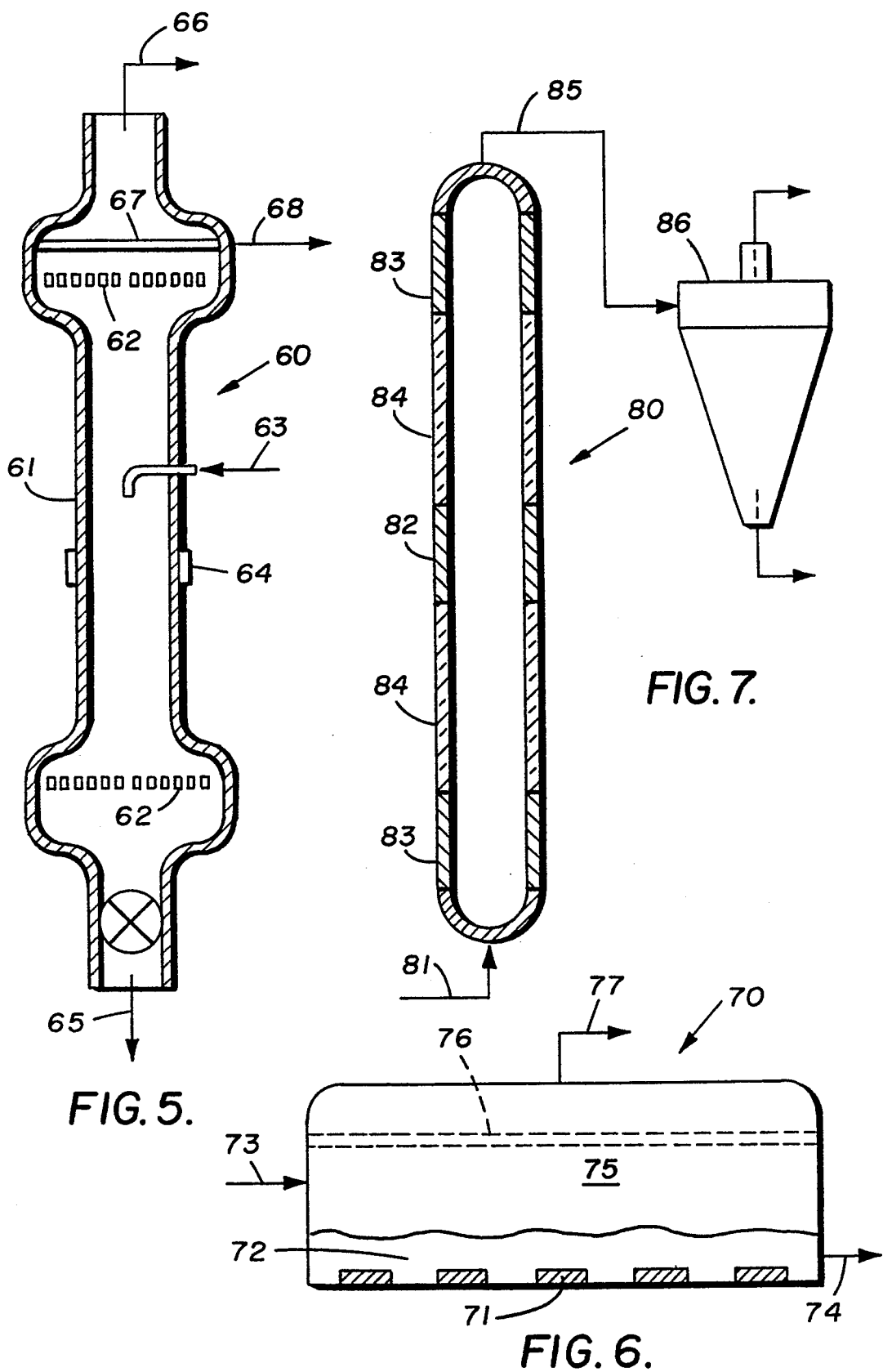

PROCESS FOR WASHING CONTAMINATED SOIL

BACKGROUND OF THE INVENTION

The present invention relates to methods and apparatus for removing contaminant substances from earth materials inclusive of soil and minerals. More particularly, the present invention relates to methods and apparatus for removing contaminant, undesirable substances from soils, minerals, clays, sediments, sludges and acquiescent slurries by energizing said slurries through electric current flow which produces volume boiling physical dislodgement of the contaminant component from the soil particular matter.

Earth materials inclusive of soils, minerals, sediments and acquiescent slurries containing earth materials may become contaminated with a wide variety of toxic and hazardous substances as a result of leaks, spills and inadequately managed landfills. Frequently, the soil or earth contaminants fall into two categories, organic materials including hydrocarbons and heavy metals. Current federal and state regulations require that these contaminants be removed from the earth materials. A wide variety of processes have been developed for this task. For example, a process such as incineration of soil can effectively destroy organic contaminants, but is expensive and may permanently alter the soil itself, and is not effective for removal of heavy metals. If the contaminant is soluble and solvent, solvent extractions can be used to remove the contaminant, however, solvent extraction is an expensive process since the solvent must be separated from both contaminants and the treated soil and reused. If the contaminant is volatile, it may be vaporized from the soil by sample heating, however, such volatile emissions are objected to by the same current federal and state regulations. Biodegradable contaminants may be removed by microbial action, but such a process is a rather slow process and must be monitored carefully to maintain large concentrations of effective microbes.

It is well known and documented that there are many sites in the United States and the world where major hydrocarbon and/or toxic waste spills or dumping have occurred that contaminate an area both on the surface and below ground at the site. Many such sites are associated with former or existing petroleum or petrochemical processing plants, chemical manufacturing facilities including those making insecticides and other toxic chemical substances, or sites where waste materials are intentionally or inadvertently dumped for disposal.

Such sites have earth materials that are contaminated either at the earth's surface or subsurface or both. Such contamination poses hazards to people, animals and plant life exposed to the materials at the surface, or even more insidious and dangerous, is the long-term hazards to drinking water supplies because of percolation through the earth by leaching of ground water out of the immediate site. In addition, oil spills along coast lines, although not frequent, can cause severe damage to marine and wildlife in the effective area, damage water resources and cause severe economic loss in the effected area. Cleanup methods are exceedingly expensive and cumbersome, time consuming, and result in large quantities of polluted materials, usually contaminated earth materials that must be disposed of at yet another geographic location.

Isolation and removal of these contaminated earth materials to another remote location for disposal and/or treatment involves considerable expense. Such removal necessarily involves containment and often the containerized materials are stored for long periods of time or never processed due to the difficulty and/or expense associated with processing. Frequently, contaminated earth materials must be excavated and removed in an attempt to remove all of the contaminated earth materials present, said excavation requires a substantial task, frequently within cities wherein, for example, established gasoline tanks have existed for years. Such excavated and removed earth materials often involve hundreds of tons of materials which are shipped in suitable protective containers or secured vehicles to remote processing site or more commonly for disposal in a remote dump site.

On-site treatment of contaminated earth materials has been attempted, principally on small sites where chemical neutralization and/or removal have been attempted with limited success, or the contaminated materials are incinerated to burn the pollutant substances. However, there is considerable controversy involving incineration methods and the potential release of unburned pollutants and hazardous materials into the atmosphere. Most chemical treatment and recovery methods remain ineffective and pose intolerable expense and sometimes questionable results.

No truly satisfactory method of overall soil treatment and purification has been previously available. Generally, treatment methods have involved either incineration alone, microbial treatment, solvent extraction, vaporization or some combination thereof. These methods have not completely been satisfactory. For example, the typical incineration process requires a large incinerator to be assembled near the contaminated soil or be at some remote location. The incineration processes generally destroy much of the organic material and also result in a large volume of ash material which may still be substantially contaminated and must be secured in yet another dump site.

Microbial purification of various hydrocarbon contaminates has not proven to be totally satisfactory. While in the laboratory microbial action may be shown to be capable of detoxifying soil materials, in the field such methods are less efficient. For example, variations in soil conditions such as temperature, moisture and oxygen create a control issue hence, these, variables are essential to the process and yet difficult to achieve. Further, complete microbial detoxification of concentrated contaminants may take long periods of time and during that period of time further leaching from the dump site may occur.

Soil washing is a simple, direct approach for removal of many organic and inorganic contaminants from soil. In soil washing technology's current state of development, soil washing is most applicable to soil containing only small portions of silts and clays. These clays and silts frequently remain contaminated after washing with existing processes, and so they must be treated by other processes, or stored indefinitely in a secure landfill. The very large specific surface area of clays and silts provides the opportunity for large quantities of contaminants to become attached to the soil by a variety of mechanisms. In addition, it is difficult to apply energy directly to the very small particles to dislodge the contaminants. For these reasons, current applications of soil washing processes are to soils containing mostly coarse silt and sand.

These disadvantages of the prior art are overcome by the present invention which provides novel methods and apparatus for on-site isolation and treatment in removal of contaminant substances from the contaminated earth material, including recovery of such contaminant substances and the return of the cleansed and decontaminated earth materials to the excavation site.

SUMMARY OF THE INVENTION

According to the present invention, methods and apparatus are provided for cleaning up materials such as earth materials, soils, sludges, sediments, clays, acquiescent slurries and other materials contaminated by toxic, hazardous or otherwise undesirable substances. These methods are particularly well suited for cleaning contaminated earth materials found at contaminated sites. These methods are easily scaled to meet the requirements of particular clean-up operations both at the site or at remote locations.

The focus of this invention is directed to methods for scrubbing both organic and inorganic contaminants, including heavy metals, from the surface of very small soil or mineral particles. Many known processes can be employed for preparation of slurries of the soil, for separation of the contaminant components scrubbed or dislodged from the soil particles, and for subsequent treatment of the soil and the contaminant components removed from the soil.

In one embodiment, the invention utilizes the flow of electrical current through an acquiescent slurry of the contaminated soil which is to be washed treated. The water may also contain additives to facilitate soil scrubbing, and subsequent separation of the contaminant components scrubbed from the soil particles. An electrical current causes the slurry to boil, as a result of thermal energy released, due to the electrical resistance of the soil slurry. This boiling occurs within the slurry itself, where sufficient current is flowing and hence is termed volume boiling. For the purposes of this invention disclosure, volume boiling is defined as that boiling which occurs within the slurry itself and is clearly distinguished from normal boiling which occurs on a heated surface. The result of volume boiling energizes the scrubbing process. It should be noted that the entire volume of slurry present in the treatment vessel does not need to be heated to its boiling point. Volume boiling can occur locally, where the current is flowing, before the remaining fluid in the treatment vessel has been heated sufficiently to boil.

The contaminated soil slurry to be cleaned, can be directly heated by the flow of electric current through slurry. The current will heat the water to its boiling point and continue to superheat the water until boiling is nucleated on the surface of the soiled particles. It is to be noted that particle nucleated boiling, as discussed in this disclosure should be distinguished from nucleate boiling on a heated surface, commonly discussed in heat transfer literature. A bubble of steam generated on the contaminated soil particle will serve to dislodge contaminants from the soil particle. Continued boiling will be much less effective for removal of contaminants then the initial nucleation of the steam bubble on the soil surface. In one embodiment of the invention, the electrical current should be caused to flow through the soil-water slurry in brief but intense pulses to start nucleate boiling on soil particles, then the flow of electric current can be ceased until the steam bubbles have left the zone in which electrical current has flowed. In the alternative, such fluid dynamics can be utilized so that the slurry itself is moved beyond the flow of electrical current in a continuous flow process. By these means the electrical power requirements for dislodgment washing will be minimized. The washed soil and contaminants must be separated. Such separation can be accomplished by known means such as liquid cyclones, centrifuges, screens, settling basins, and the like. In many applications insoluble contaminants will coalesce and float to the slurry surface. The water phase can be recycled to prepare further contaminated soil slurries. The cleaned soil can be drained of water and returned to the original excavation site or, optionally, the soil can be washed with fresh water and/or steam which has been generated by the washing operations before returning to the excavation site. Additives to the water phase will in some cases facilitate the washing procedure, such additives include solvents, acids or bases for pH adjustment and detergents.

A convenient means to cause electrical current to flow through the contaminated soil slurry to be scrubbed is by means of electrodes placed in the slurry, although other means of causing an electrical current to flow through the slurry are deemed to be feasible. Either alternating current or direct current may be employed, however, alternating current is preferred in that avoidance of lost power due to electrolysis of the water is achieved. Sixty hertz power is effective for the process, but higher frequencies may be employed to minimize polarization of the electrodes at high current densities, and the problem of alternating current electrolysis. The voltage required to produce the desired current flow is dependent upon many variables including electrode configuration, electrode polarization, and electrical conductivity of the contaminated soil slurry. An electrical conductivity of the contaminated soil slurry may be adjusted by the addition of soluble salts, acids or bases and the like. In general, a relatively high voltage is preferred, because this voltage reduces the required current capacity of the electrodes. Any electrical conductor may be used for electrodes, but electrodes having high electrocatalytic activity are preferred. Platinum, chromium, nickel, iron, and their alloys are suitable for use as electrodes in this invention. Electrodes made of an inert base metal and coated with particularly active electrocatalytic materials such as iridium oxides may also be utilized. These highly electrocatalytic electrodes permit volume boiling to occur without significant boiling on the surface of the electrode due to electrochemical polarization.

Another means to facilitate volume boiling of the contaminated soil slurry uses enlarged electrodes, which need not have high electrocatalytic capability. However, in this case, the electrodes are separated by a relatively small orifice made in the electric insulator. Such an orifice causes all the current flowing between the two electrodes to flow through the orifice. The resulting high current density causes volume boiling to occur in the vicinity of the orifice in an isolated fashion.

BRIEF DESCRIPTION OF THE DRAWINGS

The drawings constitute a part of the invention disclosure and include exemplary embodiments of the present invention, while illustrating various objects and features thereof.

FIG. 1 is a flow sheet for continuous volume boiling, washing of contaminated soil slurry utilizing orifices to concentrate the current flow and to cause localized volume boiling.

FIG. 2b is a side view of the electrode configuration of FIG. 2a;

FIG. 3b is a cross-sectional view of the electrode configuration of FIG. 3a;

FIG. 4b is a top-sectional side view of the batch reactor of FIG. 4a;

FIG. 5 is a flow sheet of a counter flow contaminated soil scrubbing apparatus with particle nulceated boiling or isolated volume boiling capabilities;

FIG. 6 is a schematic flow sheet of yet another contaminated soil scrubbing apparatus for localized volume boiling or particulate nucleated boiling;

FIG. 7 is a schematic flow sheet for a pipeline contaminated soil scrubbing apparatus with localized volume boiling or particle nucleated boiling.

DETAILED DESCRIPTION OF THE INVENTION

Figure 2A:
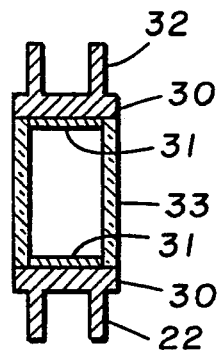
FIG. 2a is an end view of an electrode configuration using electrodes having high electrocatalytic activity.

FIG. 1 represents a process flow sheet for one embodiment of the process. Dry soil which has been crushed and screened to remove rocks and debris which might hamper the process is continuously delivered to the feed tank 10. If the soil contains contaminants whose density is greater than that of water, sufficient low density solvent should be mixed with the soil to reduce the density of the solvent-contaminant mixture to above that of water. Alternatively, the contaminated fines fraction from another soil washing process can be supplied to the feed tank 10. Recycled water which may contain some clay, stream 22, is supplied to the feed tank 10. Chemicals may be added to the feed tank 10 as desired to adjust the pH, and electrical conductivity of the slurry and to facilitate the washing process in other ways. Detergents may facilitate removal of organic Contaminants. Acids and sequestering agents may be needed for removal of heavy metals. The feed tank 10 is supplied with an agitator 11. This agitator 11 may be of a high shear type to disperse any agglomerates of particles in the soil. The feed tank 10 may be divided into interconnected compartments, so that undispersed soil does not enter directly into the processing zone. The processing zone consists of three compartments 12 made of, or lined with, an electrically insulating material such as plastic or glass. Each compartment contains an electrode 13. The center electrode is connected to a suitable voltage source, and the outer two electrodes are connected to the ground side of the same voltage source. The electrode compartments are separated from each other by an electrically insulating orifice plate 14, in which a hole 15 is placed near the bottom to facilitate soil movement through the apparatus. The compartments are supplied with stand-pipes 16 to allow steam and volatile contaminants to be removed in indicated streams 17. These streams are condensed and volatile contaminants recovered in facilities which are not shown on the drawing. Non-volatile contaminants 18 float on the surface of the stand-pipes and the settler 19 and may be skimmed off as needed. The treated soil slurry discharges into a settler 19. In the settler 19 the treated soil settles to the bottom for discharge through a star-valve 21. As it settles, fresh makeup water 20 is supplied to rinse the soil. Remaining contaminants 18 float to the top of the settler 19. Near the top of the settler 19 water and suspended clay is removed for recycle to the feed tank 10. If desired, clay can be removed from the recycled water stream 20 by means of liquid cyclone or other means, not shown.

Figure 2B:
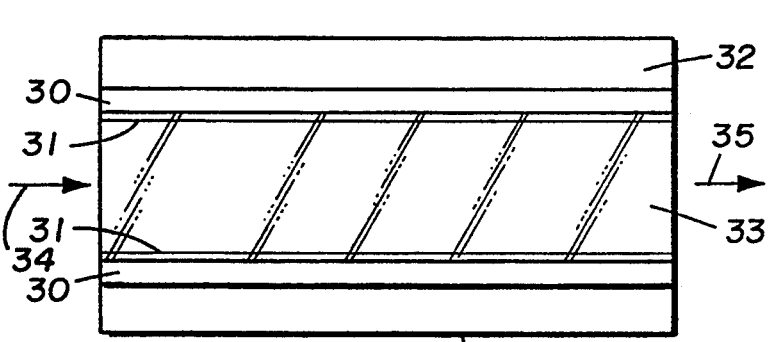

FIGS. 2a and 2b show another arrangement of electrodes to accomplish soil washing by means of volume boiling. The electrodes 30 are provided with electrochemically active surfaces 31 and cooling fins 32 to minimize boiling on the surface of the electrode. The electrodes 30 are separated by electrically insulating panels 33 which also serve to confine the soil slurry being processed. The slurry is pumped in at one end 34 and a mixture of steam and washed soil leave at the other end 35 for separation. The soil processing cell shown in FIGS. 2a and 2b must be incorporated into a complete process, which includes sections to prepare the soil slurry and to separate contaminants from the washed soil.

Figure 3A:
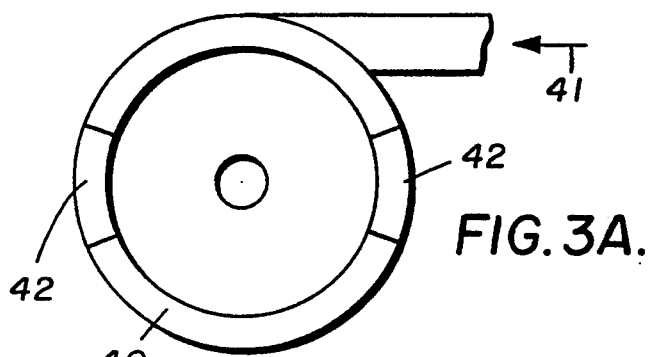
FIG. 3a is a top view of another electrode configuration which utilizes centrifugal force to increase the effectiveness of the volume boiling process.
Figure 3B:
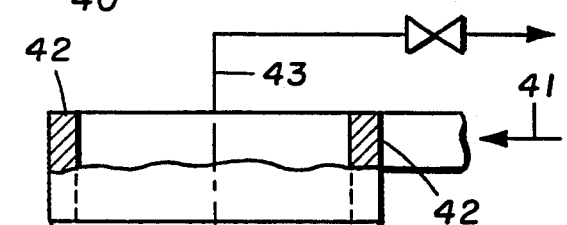

FIGS. 3a and 3b show still another arrangement of electrodes in which centrifugal force increases the effectiveness of the volume boiling process for washing soil. The centrifugal forces cause steam bubbles to be separated from the soil slurry with greater speed and violence to aid scrubbing. Centrifugal forces are applied to the soil slurry by means of a liquid cyclone 40 in which the soil slurry 41 enters tangentially. The liquid cyclone 40 is made of an electrically insulating material such as ceramic. Electrodes 42 are placed on the circumference of the cyclone. More than two electrodes 42 may be employed; for example, three-phase power would require three electrodes. Steam, contaminants and some water are removed from the top center 43 of the cyclone. Washed soil is removed from the bottom of the cyclone 44.

Figure 4A:
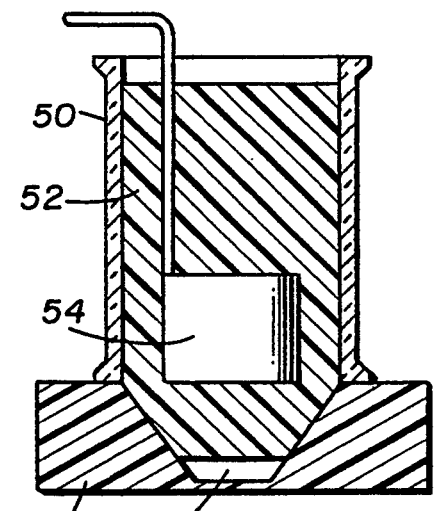
FIG. 4a is a cross-sectional side view of a batch reactor used in demonstrating the volume boiling process.
Figure 4B:
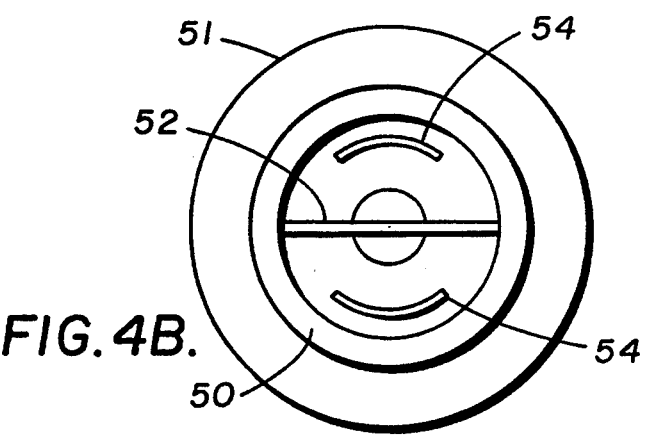

FIGS. 4a and 4b show the apparatus in which the process shown in FIG. 1 was tested as a small scale batch process. It consists of a section of glass pipe 50 with a tapered, plastic bottom 51. The cell is divided in half vertically by a plastic partition 52. An orifice 53 is provided at the bottom of the partition, through which volume boiling is caused to occur by means of current flowing between the two electrodes 54. In the operation of this batch process, volume boiling, which occurs in and near the orifice, causes the soil slurry and steam to be displaced from near the orifice, then fresh slurry flows into the orifice area to be subjected to the volume boiling process.

Equipment Configurations to Accomplish Soil Washing

The broad concept of using the soil particles to nucleate the boiling process on their surface can be utilized in many mechanical configurations. Three of these configurations shown in FIGS. 5, 6 and 7. FIG. 5 shows a simple configuration which utilizes countercurrent flow scrubber 60 to repeatedly scrub wash both the falling soil particles and the rising contaminants. The narrow central portion 61 of the apparatus causes the current density to be high in that region to concentrate electric power release away from the larger electrodes 62 at the top and bottom of the apparatus. Dry soil could be fed directly to this apparatus, but premixing of the soil with water, solvents and other chemicals may be desirable. To minimize the soil content of the recovered contaminants, the soil slurry 63 should be added near the middle of the column. If particulates in the contaminants being removed is not a concern, soil could be supplied at the top of the column. Using the optional electrode 64 instead of the top electrode would allow steam generation to be concentrated at the bottom of the column to further reduce electric power requirements. Water could be injected near the bottom of the apparatus to countercurrently wash the soil with clean water, if desired. When large diameter soil washers are made in this configuration, it may be desirable to have vertical baffles to minimize gross mixing of the water within the apparatus. Scrubbed soil 65 flows from the bottom while steam and volatile contaminants 66 flow from the top of the scrubber 60. Contaminants of layer 67 are removed from the scrubber 60 at means 68.

FIG. 6 illustrates an implementation of the invention which uses the pulse of electric power applied to the soil slurry to mix and transport the soil as well as to scrub it. The pulse scrubber 70 uses pairs of electrodes 71 positioned on or near the bottom of the apparatus. When a pulse of electric power is applied, one pair of electrodes steam is nucleated on the particles, and the rapid generation of steam almost explosively propels the soil lay 72 particles up from the bottom of the apparatus for mixing with the water. By applying power sequentially to the electrode pairs 71 movement of soil layer 72 from the inlet 73 to the outlet 74 of the apparatus can be facilitated. Contaminants removed from the soil will float to the surface of the water 75 forming a contaminant layer 76 which is removed. Steam and vapors 77 are vented to purge the apparatus.

The least complex means to utilize particle nucleated boiling for scrubbing soil particles is shown in FIG. 7. Metallic pipe 80 is used with hot electrode 82 and grounded electrodes 83 spaced apart by sections of glass or ceramic pipe 84. Use of two sections of glass pipe, as shown, allows both ends of the apparatus to be ground potential so as to simplify design and operation of the soil cleaning apparatus. The soil slurry 81 flowing through this electrode section will be subjected to a brief pulse of electric power while it is between the electrodes. The mixture of soil, water, contaminants and steam 85 would then flow directly to a separation device 86. This is illustrated as a liquid cyclone in the drawing, but any separation procedure could be utilized.

Chemical Additives to Facilitate Soil Scrubbing

Several types of chemical additives can be utilized to facilitate soil scrubbing: solvents; acids or bases for pH adjustment; inorganic salts; and surface active agents. Solvents will be essential to mix with contaminants whose specific gravity is greater than one. These contaminants would tend to sink with the soil, if they were not diluted with low density solvents to result in a mixture whose specific gravity is less than one. Chlorinated hydrocarbons, asphalts, and some heavy oils are examples of contaminates which would require solvent dilution, so they would float after removal from the soil. The process proposed in this document would require only small amounts of solvent, 1 to 10 times the amount of contaminant present, in contrast to solvent extraction methods which employ large amounts of solvent. The solvent would also serve to dissolve solid contaminants and to reduce the viscosity of liquid contaminants. Diesel or kerosine cuts from distillation of petroleum would be the least expensive solvents to employ. Much of the solvent could be recycled by distilling it from the recovered contaminants. The solvent would be most effective if it were mixed with the soil and the mixture allowed to stand for hours or even days prior to the scrubbing treatment, so the solvent can diffusive into the contaminants.

Alkaline solutions are generally more effective in water washing operation of many kinds. For this reason maintaining a rather high pH in the water slurry could be expected to facilitate removal of contaminants. If it were desired to remove heavy metals, an acid solution could be employed. Excessive amounts of carbonates in the soil would tend to consume considerable amounts of acid in this case.

Salts could be added to prevent dispersion and hydration of clays in the soils. Potassium and calcium salts are frequently used for this purpose. Adding large amount of dissolved salts would increase the density of the water phase, and increase the rate at which contaminants float to the surface.

Surface active agents added to the water phase can serve several purposes. First they can assist in dislodging contaminants from the soil. They can also assist in the agglomeration of the contaminants, and their floating to the surface. In some cases contaminants might be caused to adhere to steam bubbles and be transported to the surface, as accomplished with air froth flotation benefication of minerals.

With regard to the removal of heavy metals, chelating agents and/or acids may be added to facilitate removal of heavy mealts from the soils being treated, and to retain the heavy metals in the water phase.

Experimental Verification of the Process

Figure 8:
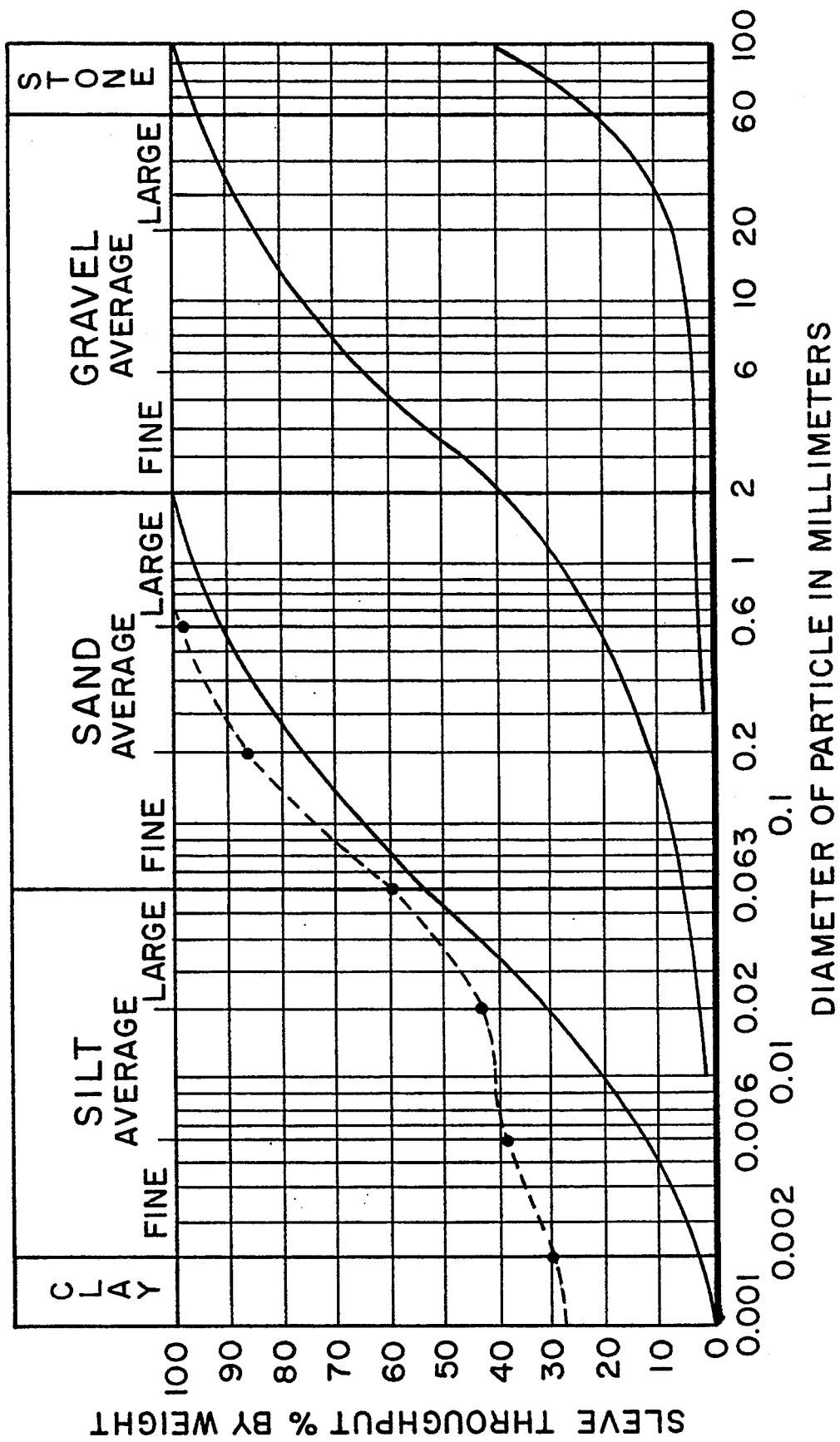
FIG. 8 is a graph illustrating the relative difficulty of washing selective soils as well as the soil selected for experimental measurement.

The volume boiling process for soil washing was demonstrated in the apparatus shown in FIGS. 4a and 4b. A soil was selected for washing which was very difficult to wash. This fact is illustrated by FIG. 8, which was taken from an EPA publication, dividing soils into three categories of washing difficulty, as determined by the particle size distribution of the soil. The dashed line shows the soil selected for washing falls entirely in Category III, the most difficult type of soil to wash. The soil was contaminated with approximately 50,000 ppm of straight run diesel fuel, and allowed to stand a few days before testing. The characteristics of the diesel fuel were as follows:

| Vol % distilled | Temperature °F. | |
|---|---|---|
| I.B. | 460 | API Gravity |
| 10 | 500 | 32.8 |
| 30 | 542 | |
| 50 | 560 | Weight % S |
| 70 | 576 | 1.105 |
| 90 | 596 | |
| E.P. | 614 | |

After treatment, the soil was allowed to settle and water decanted from it. The remaining soil slurry was placed in a centrifuge to remove additional water from the soil, then washed with an equal volume of water containing the same concentration of sodium carbonate and centrifuged again. Residual hydrocarbons were removed from the treated soil by 16 hours of extraction with Freon-113. The Freon was analyzed for total hydrocarbons by means of Method 418.1, except that the diesel oil used to contaminate the soil was also used to prepare the standards for the test. The results are reported in Table I.

Test A-1 and A-2 were duplicate tests on the contaminated soil. In the remaining tests the amounts of water, contaminated soil, and anhydrous sodium carbonate indicated in the last three columns of the table were mixed together in a high speed mixer for 30 seconds. In test B-1, no further treatment was applied to the soil to show the effectiveness of just high speed mixing for soil washing. In this test, 7,820 ppm of diesel fuel remained after just mixing.

In tests C-1, C-2 and C-3, a resistance heater was employed which produced boiling on the surface of the heater, not within the soil slurry itself. Electric power was applied to the slurry according to the schedule indicated in the central portion of Table I. Generally 1 kW of power was applied until the entire contents of the cell reached the boiling point, then the power was reduced to 0.5 kW to prevent the slurry from boiling over the sides of the apparatus. In this series of tests, over 1000 ppm of diesel fuel remained on the soil after boiling with a conventional heater.

In tests D through I, the apparatus of FIGS. 4a and 4b was employed with variations in the amounts of water and contaminated soil used. In general, the more concentrated soil slurries were better scrubbed than the dilute solutions. Stirring the soil within the orifice with a magnetic stirrer was not particularly helpful, Test G and H. Test I employed 26.2 API crude oil, not diesel, and demonstrated that crude oil can also be scrubbed from the soil.

These tests show that soil washing by means of volume boiling, Tests D through I is far more effective than washing by means of boiling with an electric immersion heater, tests C-1, C-2 and C-3.

hydrocarbons on the soil was not known. It would be expected that this soil would be difficult to wash by conventional processes, since it contained over 50 weight percent of silt and clay. This soil was effectively washed by the process described previously. When the soil was mixed with water and sodium carbonate there resulted a very thick slurry which was difficult to process. It was also very difficult to centrifuge all apparent clay solids from the water after processing. For this reason salts other than sodium were tested. It was found that calcium hydroxide, CaOH, and potassium carbonate, $K_2CO_3$, were equally successful in washing the soil. This is illustrated in the last two series of test in Table II. The D series of tests shows that sodium carbonate is also effective in washing this soil. The B and C series of tests in this table show that just high speed mixing or heating with a resistance heater were not nearly so effective in removing hydrocarbons from the soil.

The use of calcium hydroxide and potassium carbonate instead of sodium carbonate resulted in a much less viscous slurry which was far easier to handle during the testing procedures. It was also much easier to centrifuge the soil from the clear water as shown below:

| Time Required to Centrifuge Treated Gulf Coast Soil | |
|---|---|
| Salt Used | Time (hr) |
| Sodium Carbonate, $Na_2CO_3$ | >12 |
| Calcium Hydroxide, CaOH | 2–3 |
| Potassium Carbonate, $K_2CO_3$ | 3 |

Separation of the treated soil from the process water which is generally recycled is a necessary step in any soil washing process. By adding a salt to treated soil from water is greatly facilitated, as shown above. Other mechanical means for separation treated soil from water

TABLE I
RESULTS FROM BATCH TESTS

| Test No. | Diesel Remaining ppm | Devise Used | Treatment Time and Electric Power Input | | | | Slurry Treated | | |
|---|---|---|---|---|---|---|---|---|---|
| | | | min | kW | min | kW | Water ml | $Na_2CO_3$ g | Soil g |
| A-1 | 47,600 | NONE - These were duplicate analyses | | | | | | | |
| A-2 | 47,600 | of the soil before treatment. | | | | | | | |
| B-1 | 7,820 | NONE - This is the diesel on the soil after just high-speed mixing with water and $Na_2CO_3$ for 30 s. | | | | | 600 | 80 | 2.0 |
| C-1 | 1,470 | RH[1] | 2.3 | 1.0 | 2.7 | 0.5 | 600 | 40 | 2.5 |
| C-2 | 1,200 | RH | 4.5 | 1.0 | 1.5 | 0.5 | 600 | 40 | 2.0 |
| C-3 | 1,200 | RH | 4.5 | 1.0 | 1.5 | 0.5 | 600 | 40 | 2.0 |
| D | 122 | FIG. 4 | 4.25 | 1.0 | 2.75 | 0.5 | 600 | 80 | 2.0 |
| E | 46 | FIG. 4 | 4.0 | 1.0 | 3.0 | 0.5 | 600 | 160 | 2.0 |
| F | 60 | FIG. 4 | 2.0 | 1.0 | 3.0 | 0.5 | 300 | 80 | 2.0 |
| G | 122 | FIG. 4 | 4.0 | 1.0 | 3.0 | 0.5 | 600 | 80 | 2.0 |
| H | 274 | FIG. 4 | 3.5 | 1.0 | 1.5 | 0.5 | 600 | 40 | 2.0 |
| I | 3.0[3] | FIG. 4 | 3.5 | 1.0 | 1.5 | 0.5 | 600 | 80 | 2.0 |

[1]RH stands for immersion resistance heater as used in these tests. These tests show that ordinary boiling is much less effective in removing hydrocarbons from the soil than the volume boiling process. Commercial immersion heaters were too large for 1000 ml tall form beaker used to contain the slurry being treated, so the heater was made from 350 mm of 1/16 inch stainless steel tubing and connected to a low voltage transformer.
[2]This test was stirred with a stirbar in the apparatus of FIGS. 4a and 4b. The additional mixing did not appear helpful, and might even have reduced the effectiveness of the volume boiling in removing contami
[3]This test was with 26.2 API crude oil, not diesel, and shows that crude oil can be effectively washed by the volume boiling process.

Table II presents results from washing an authentic contaminated solid taken from the "tar pit" of a major Gulf Coast petrochemical producer. The nature of the would also be facilitated by the proper selection of salts for the treatment process. These additional separation means include liquid cyclones, thickeners, and filter.

Other alkaline, soluble salts which do not facilitate the hydration of clays would be suitable for this process such as potassium hydroxide, and barium hydroxide, and perhaps other salts from IA and IIA, alkali and alkali earths, of the periodic chart. It can also be noted that calcium and potassium may frequently be considered environmentally benign, since they are utilized in the formation of fertilizers. Use of these benign salts might be considered an advantage with regard to returning the soil to its original location.

TABLE II

Results from Batch Tests
Gulf Coast Soil With Various Salts

| Test No. | Hydrocarbon Remaining ppm | Device Used | Treatment Time and Electric Power Input | | | | Slurry Treated | | |
|---|---|---|---|---|---|---|---|---|---|
| | | | min | kW | min | kW | Water ml | Soil g | Salt g |
| A | 1,700 | As received soil with no treatment. | | | | | | | |
| B-1 | 1,080 | NONE - This is the hydrocarbon on the soil after just high-speed mixing with water and salt, for two to three minutes. | | | | | 550 | 130 | 2.0 $Na_2CO_3$ |
| B-2 | 980 | | | | | | 600 | 130 | 1.4 CaOH |
| B-3 | 710 | | | | | | 550 | 130 | 2.0 $K_2CO_3$ |
| C-1 | 305 | RH[1] | 5.0 | 1.0 | | | 600 | 40 | 1.4 CaOH |
| C-2 | 325 | RH | 5.0 | 1.0 | | | 600 | 40 | 1.4 CaOH |
| C-3 | 285 | RH | 5.0 | 1.0 | | | 300 | 40 | 1.4 CaOH |
| D-1 | 34 | FIG. 4 | 4.75 | 1.0 | 0.25 | 0.5 | 500 | 130 | 2.0 $Na_2CO_3$ |
| D-2 | 22 | FIG. 4 | 4.75 | 1.0 | 0.25 | 0.5 | 500 | 260 | 2.0 $Na_2CO_3$ |
| E-1 | 46 | FIG. 4 | 5.0 | 1.0 | | | 600 | 130 | 1.4 CaOH |
| E-2 | 38 | FIG. 4 | 5.0 | 1.0 | | | 600 | 260 | 1.4 CaOH |
| F-1 | 28 | FIG. 4 | 4.5 | 1.0 | 0.5 | 0.5 | 550 | 130 | 2.0 $K_2CO_3$ |
| F-2 | 10 | FIG. 4 | 4.5 | 1.0 | 0.5 | 0.5 | 500 | 260 | 2.0 $K_2CO_3$ |
| F-3 | 20 | FIG. 4 | 4.25 | 1.0 | 0.75 | 0.5 | 275 | 130 | 2.0 $K_2CO_3$ |

[1]RH stands for immersion resistance heater as used in these tests. These tests show that ordinary boiling is much less effective in removing hydrocarbons from the soil than the volume boiling process. Commercial immersion heaters were too large for 1000 ml tall form beaker used to contain the slurry being treated, so the heater was made from 350 mm of 1/16 inch stainless steel tubing and connected to a low voltage transformer.

It is to be understood that while certain embodiments of the present invention have been illustrated and described, the invention is not to be limited to the specific steps, forms or arrangements hereindescribed and shown, except as limited by the following claims.

I claim:

1. A process for removing contaminants from particulate materials, comprising:
   mixing contaminated particulate materials with water;
   converting the contaminated particulate materials and water mixture into a water slurry;
   energizing the water slurry to volume boiling conditions by causing an electrical current to flow through the slurry of water and contaminated particulate materials;
   initiating particulate nucleated boiling and dislodging Of contaminants from the particulate by steam bubble formation on the contaminated particulate surface;
   separating the particulate materials which are substantially free of contaminants from the slurry; and
   recovering the contaminants from the slurry.

2. The process according to claim 1 wherein the particulate materials are comprised of earth materials.

3. The process according to claim 1 wherein the contaminants are organic substances.

4. The process according to claim 1 wherein the contaminants are inorganic substances.

5. The process according to claim 4 wherein the inorganic substances are comprised of heavy metals.

6. The process according to claim 1 wherein the contaminants are comprised of organic and inorganic substances.

7. The process according to claim 1 wherein the dislodging of the contaminants from the particulate materials is enhanced by actions of centrifugal force in addition to volume boiling.

8. The process according to claim 1 wherein electrolysis of the water is substantially avoided by use of alternating electric current.

9. The process according to claim 1 wherein the contaminants are comprised of inorganic heavy metals and the slurry is further treated by the addition of acids and sequestering agents.

10. The process according to claim 1 wherein the contaminants upon being dislodging are of such a specific gravity as to float on top of the slurry and the contaminants are removed by floatation and skimming.

11. The process according to claim 1 wherein the contaminants upon being dislodging are of a specific gravity which allows the contaminants to settle in the slurry, said slurry is treated with solvents.

12. The process according to claim 1 wherein the energizing is achieved by flowing electrical current directly into and through the slurry by exposing electrodes directly to the slurry.

13. The process according to claim 1 wherein the slurry viscosity is lower by addition of at least one of calcium hydroxide and potassium carbonate.

14. The process according to claim 1 wherein the separate particulate materials are washed in water.

15. A process for removing contaminants from soil, comprising:
   isolating contaminated soil and mixing with water;
   converting the mixture of contaminated soil and water into a fluid slurry;
   causing an electric current to flow through the slurry;
   energizing the slurry to volume boiling conditions by the direct flow of electric current;
   initiating soil particles nucleated boiling and dislodging of contaminants from the particle by steam bubble formation on the contaminated soil particle surface;
   recovering contaminant components from the slurry; and
   separating the soil particulate material substantially free of contaminant substances from the slurry.

16. The process according to claim 15 wherein the particulate materials are comprised of earth materials.

17. The process according to claim 15 wherein the contaminants are organic substances.

18. The process according to claim 15 wherein the contaminants are inorganic substances.

19. The process according to claim 15 wherein the contaminants are comprised of organic and inorganic substances.

20. The process according to claim 15 wherein the dislodging of the contaminants from the particulate materials is enhanced by actions of centrifugal force on the slurry as the slurry passes by the energizing electrical current.

21. The process according to claim 15 wherein electrolysis of the water is substantially avoided by use of alternating electric current.

22. The process according to claim 15 wherein the contaminants are comprised of inorganic heavy metals and the slurry is further treated by the addition of acids and sequestering agents.

23. The process according to claim 15 wherein the contaminants upon being dislodged are of such a specific gravity as to float on top of the slurry and the contaminants are removed by floatation and skimming.

24. The process according to claim 15 in which soluble salts, acids or bases are added to the soil slurry to adjust its electric conductance to an optimal value for volume boiling in the particular apparatus employed.

* * * * *